United States Patent Office 2,817,678
Patented Dec. 24, 1957

2,817,678

TELOMERIZATION OF PERHALOOLEFINS AND CHLOROFORMATES

William S. Barnhart, Cranford, N. J., assignor, by mesne assignments, to Minnesota Mining and Manufacturing Company, St. Paul, Minn., a corporation of Delaware No Drawing. Application October 29, 1954
Serial No. 465,715

7 Claims. (Cl. 260—487)

This invention relates to the preparation of oil, grease, and wax-like fluorine-containing polymers or telomers. More particularly, the invention relates to the preparation of telomers in which alkyl halocarbonates are employed as telogens.

Polymers of fluoroethylenic compounds have previously been prepared using chloroform, for example, as a telogen in a molar ratio of about 9 moles of telogen to 1 mole of monomer. The resulting polymers are high molecular weight waxes, and the length of the chain may be increased or decreased by varying the molar ratio of the telogen to the monomer. These high molecular weight waxes are often pyrolyzed to form unsaturated liquid polymers of shorter chain length. The pyrolysis requires a high temperature and must be performed under reduced pressure to obtain maximum yields. Only 10 to 40 percent of the product is composed of distillable fluids, these fluids being unsaturated oils which are unstable. To render these oils stable to heat, light, and chemical attack, fluorination with cobalt trifluoride, chlorine trifluoride, or some other suitable fluorinating agent is required.

In accordance with the present invention, it has been found that saturated fluid polymers of fluoroolefinic compounds may be prepared by using alkyl halocarbonate telogens in a molar ratio with a fluoroolefinic monomer in the range of 10:1 to 1:3, the preferred ratio being 2 moles of telogen to 1 mole of monomer. Using a molar ratio of telogen to monomer within the range above specified results in the conversion of monomeric fluoroolefinic compounds to polymeric compounds in a yield which may be as high as 70 percent, based upon the weight of fluoroolefinic compounds originally charged. Impurities in the polymer products obtained may be removed by conventional methods.

The products have many and varied uses, such as intermediates for synthesizing a variety of other compounds. The products are also useful precursors for the production of perfluorochlorocarboxylic acids, which have unique properties as surfactants.

A fluoroolefinic monomer may be homotelomerized or cotelomerized with another cotelomerizable olefin in the presence of a peroxy type polymerization promoter and an alkyl halocarbonate telogen having the formula

in which R is an alkyl radical having from 1 to 5 carbon atoms. Exemplary of the telogens contemplated are methyl chlorocarbonate and ethyl chlorocarbonate.

These telogens supply the terminal groups for the telomeric chain and control the telomerization by limiting the free radical propagation reaction. This latter phenomenon is illustrated by the observation that, with varying amounts of telogen, the telomeric product may be obtained primarily as a liquid, oil, grease, or wax.

The telomerization reaction occurs essentially as shown below in a typical reaction employing chlorotrifluoroethylene as the monomer and ethyl chlorocarbonate as the telogen in the presence of a promoter, such as benzoyl peroxide

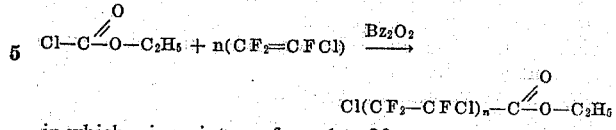

in which n is an integer from 1 to 20.

The telomers formed by the telomerization of fluoroolefinic compounds with the telogens above described are new to the art and have the general formula

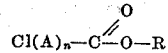

in which A is a monomer unit, which may be a single fluoroolefinic compound or a monomer unit containing a fluoroolefinic compound and a cotelomerizable monomer, n is an integer from 1 to 20, and R is an alkyl radical having from 1 to 5 carbon atoms. In most cases the molar ratio of the fluoroolefinic compound to the comonomer is in the range of 9:1 to 1:9.

Monomers which undergo telomerization are those containing the group $$-\overset{\mathrm{F}}{\underset{|}{\mathrm{C}}}=\overset{|}{\mathrm{C}}-$$

and those monomers which homotelomerize with difficulty may be cotelomerized with other more readily polymerizable monomers. The olefinic compounds which may be employed as the fluoroolefinic compounds in the present invention are telomerizable compounds containing at least one double bonded carbon atom and at least one fluorine atom attached to one of the double bonded carbon atoms, the other atoms being any of the halogens, hydrogen and carbon.

When the telomer is obtained by homotelomerization, each A in the formula

represents the same monomer unit throughout, and when the telomer is obtained by cotelomerization, A represents different monomer units wherein at least one is a fluoroolefinic monomer unit. The telomerization conditions are essentially the same for both homo- and cotelomerization, and the term telomerization is therefore intended to include both types of reactions.

The invention is particularly applicable to the homotelomerization of partially halogenated hydrocarbon olefins containing fluorine, such as vinyl fluoride, fluoroprene, trifluoroethylene, vinylidene fluoride, the fluorinated propenes, butenes, butadienes, and amylenes; fluorohaloolefins, such as monofluoromonochloroethylene, difluoromonochloroethylene, dichloromonofluoroethylene; and partially halogenated propenes, butenes, butadienes, and amylenes, containing both fluorine and chlorine. The invention also includes the use of completely halogenated olefins, such as the perfluorochloroolefins and perfluoroolefins, e. g., trifluorochloroethylene, difluorodichloroethylene, tetrafluoroethylene, perfluoropropene, dichloroperfluorobutene, perfluorobutadiene, and perfluoroamylene. The preferred olefins are the perhalomonoolefins having not more than 5 carbon atoms per molecule and having at least one fluorine atom attached to each carbon atom.

As previously disclosed, the invention also includes the cotelomerization of the above monomers as well as the homotelomerization thereof. Among the monomers which may be cotelomerized are trifluorochloroethylene and tetrafluoroethylene, but it is not mandatory that the comonomers be selected from olefins containing fluorine. The comonomers may be any hydrocarbon olefin, either alicyclic or acyclic, such as ethylene, propene, butene, amylene, and butadiene; or a partially halogenated hydrocarbon olefin, either alicyclic or acyclic, e. g., vinyl chloride, vinylidene chloride, trichloroethylene, chloroprene, and the chlorinated propenes, butenes, butadienes, and amylenes; or a perhalogenated olefin, e. g., tetrachloroethylene and perchloropropene; or any copolymerizable olefin, other than an olefin containing an amino group, containing oxygen and/or nitrogen, such as methyl methacrylate, vinyl acetate, fluoroacrylates, and fluorinated acrylonitrile. The invention includes, as comonomer olefins, the olefins disclosed above substituted with aromatic and halogenated aromatic radicals.

The telomers resulting from the cotelomerization of an olefin monomer containing fluorine and a comonomer of the type disclosed above are also novel compositions of matter.

The telomerization process of the invention is performed in the presence of about 0.05 to 10 percent by weight, based upon the weight of monomer or monomers charged, of an organic peroxide polymerization promoter, such as benzoyl peroxide, chlorobenzoyl peroxide, lauroyl peroxide, tertiary butylhydroperoxide, acetyl peroxide, trichloroacetyl peroxide, fluorochloropropionyl peroxide, chloroacetyl peroxide, and propionyl peroxide.

The fluorinated telomers may be prepared by the telomerization of the monomer, or monomer and comonomer, at temperatures in the range of 0° C. to 200° C. and at pressures sufficient to maintain the reactants in the liquid phase. The process may be conducted in either a batch or continuous manner. The molecular weight of the product is decreased as the quantity of telogen present in the reaction mixture is increased. The various telomer product fractions are separated by conventional methods, such as distillation, solvent extraction, and the like.

More specifically, benzoyl peroxide catalyst is dissolved in a suitable solvent and treated for the removal of water. An autoclave is then flushed with nitrogen gas to remove all oxygen and is then charged with the mixture of benzoyl peroxide and telogen. The system is closed, and a fluoroolefinic monomer is pressured into the autoclave, which is then heated for the desired period of time at an elevated temperature while the reaction mixture is agitated. A maximum autogenous pressure is reached during the reaction which slowly subsides, although the autoclave may be pressured to pressures as high as about 1000 p. s. i. g. with nitrogen gas, for example. When the pressure ceases to drop, the heating is discontinued, and gases are vented from the autoclave through a low-pressure condenser into a storage trap, the condenser and storage trap being maintained at a low temperature. The low boiling fractions, which are removed from the autoclave, are then fractionated to remove unreacted monomer. Any excess solvent, if a solvent is employed, and unreacted monomer are stripped from the product by heating the reaction mixture. Distillation of the product at reduced pressure produces the final products which may be obtained in various fractions, if desired.

Solvents such as $CF_2Cl—CFCl_2$ may be employed in the polymerization reaction of the invention, if desired, but they are not essential. The solvents may also be employed to dissolve the organic peroxide catalyst, as above described.

The invention will be further illustrated by reference to the following specific example, in which all parts are by weight:

*Example*

A stainless steel bomb was charged with 217 parts of ethyl chlorocarbonate and 4.8 parts of benzoyl peroxide, after which the bomb was attached to the agitator of a washing machine in which steam coils were mounted for the purpose of heating the water bath to the desired temperature. The apparatus was flushed with nitrogen to remove residual oxygen, and after cooling the bomb to a temperature of −25° C., 116.5 parts of liquid chlorotrifluoroethylene were pressured in. The resulting mixture had a molar ratio of ethyl chlorocarbonate to chlorotrifluoroethylene of 2:1 and contained 0.02 mole of benzoyl peroxide. The bomb was then sealed, agitated, and heated in the washing machine for a period of four hours at a temperature of 95° C. A high autogenous pressure in excess of 500 p. s. i. g. was obtained as a result of the formation of hydrogen chloride gas. At the expiration of the four hour period, the bomb was cooled to a temperature of 25° C. and vented before the removal of the product, which was poured into water, separated, and distilled. 9 parts of liquid product, boiling in the range of 40 to 200° C./0.1 mm. Hg absolute, and 14 parts of waxy residue were obtained, corresponding to a yield of 20 percent, based upon the weight of monomer charged.

In addition to the other uses previously specified, the novel compounds of the invention are useful as plasticizers, for example, in an amount equivalent to about 1 to 20 percent by weight with the plastic homopolymer of chlorotrifluoroethylene.

It will be obvious to those skilled in the art that many modifications may be made within the scope of the present invention without departing from the spirit thereof, and the invention includes all such modifications.

I claim:

1. A process for preparing a fluorine-containing telomer which comprises telomerizing a perhalomonoolefin containing from 2 to 5 carbon atoms and containing at least one fluorine atom attached to each carbon atom in the presence of a peroxy compound as a promoter and an alkyl chlorocarbonate telogen having from 1 to 5 carbon atoms in the alkyl group.

2. A process for preparing a fluorine-containing telomer which comprises telomerizing a perhalomonoolefin containing from 2 to 5 carbon atoms and containing at least one fluorine atom attached to each carbon atom in the presence of a peroxy compound as a promoter and methyl chlorocarbonate as a telogen.

3. A process for preparing a fluorine-containing telomer which comprises telomerizing a perhalomonoolefin containing from 2 to 5 carbon atoms and containing at least one fluorine atom attached to each carbon atom in the presence of a peroxy compound as a promoter and ethyl chlorocarbonate as a telogen.

4. A process according to claim 2 in which the perfluorohaloolefin is chlorotrifluoroethylene.

5. A process according to claim 3 in which the perfluorohaloolefin is chlorotrifluoroethylene.

6. The product of the process of claim 4.

7. The product of the process of claim 5.

References Cited in the file of this patent

UNITED STATES PATENTS

| | | |
|---|---|---|
| 2,411,158 | Hanford | Nov. 19, 1946 |
| 2,507,568 | Hanford et al. | May 16, 1950 |
| 2,583,415 | Claney | Jan. 22, 1952 |